G. H. Corliss,
Steam-Engine Valve-Gear.
No 759. Reissued July 12, 1859.
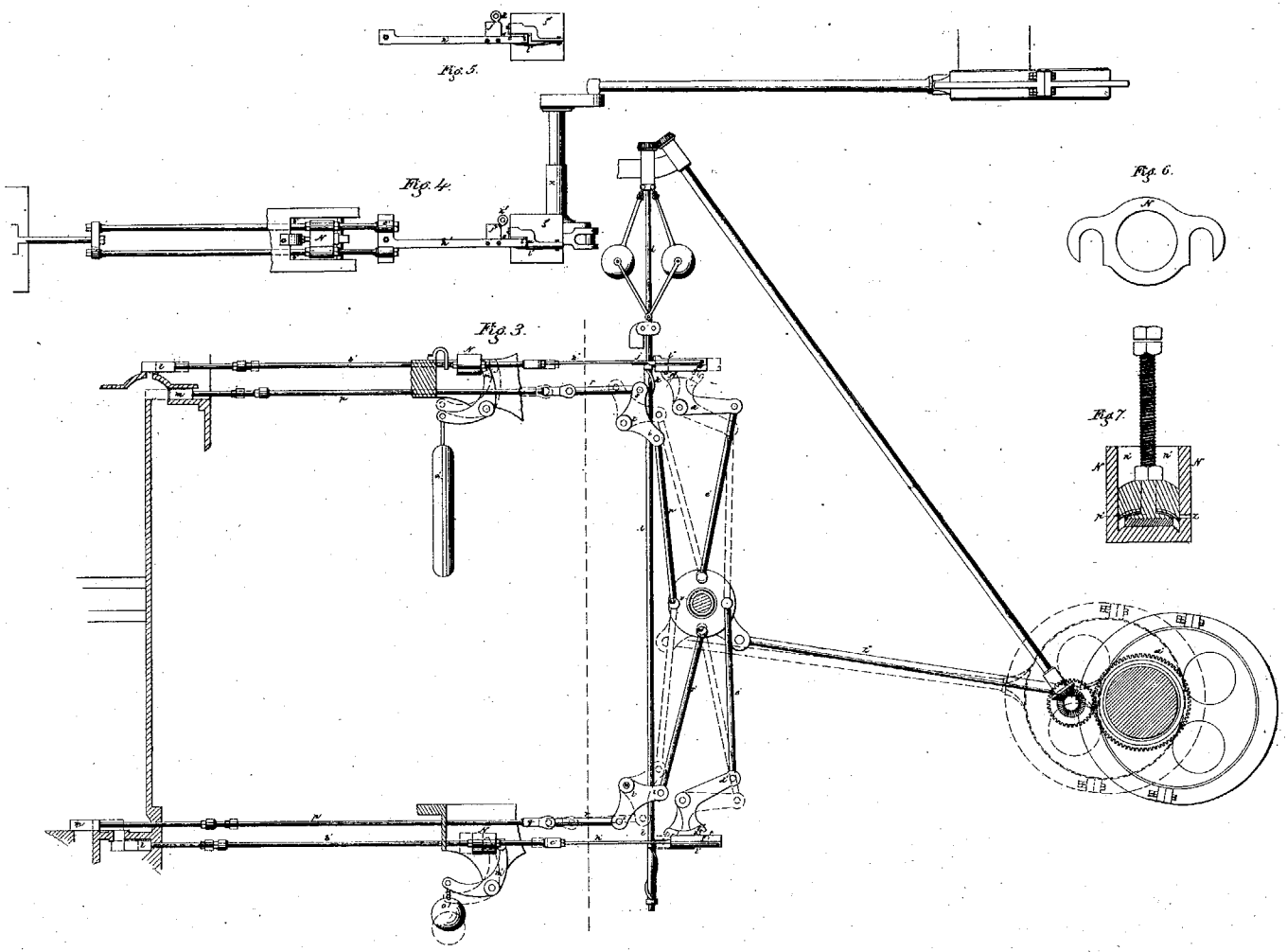
Witnesses.
Henry F. Salmon Jr.
H. A. Johnson
Inventor.
George H. Corliss
N. PETERS, PHOTO-LITHOGRAPHER, WASHINGTON, D. C.

UNITED STATES PATENT OFFICE.

GEORGE H. CORLISS, OF PROVIDENCE, RHODE ISLAND.

IMPROVEMENT IN CUT-OFF AND WORKING VALVES OF STEAM-ENGINES.

Specification forming part of Letters Patent No. 6,162, dated March 10, 1849; Reissue No. 200, dated May 13, 1851; Reissue No. 759, dated July 12, 1859.

DIVISION B.

*To all whom it may concern:*

Be it known that I, GEORGE H. CORLISS, of the city and county of Providence, in the State of Rhode Island, have invented a new and useful Improvement in the Valve Apparatus of Steam-Engines; and I do hereby declare that the following is a full, clear, and exact description of the same, reference being had to the accompanying drawings, in which—

Figure 3 represents in elevation the valve mechanism of a beam-engine to which my invention has been applied. Fig. 4 is a top view of certain portions of the same, and Fig. 5 a view of certain parts of the valve-gear detached from the remainder.

The invention which is the subject of this patent is applicable to engines in which steam or other elastic fluid is used expansively, and has reference to the apparatus by means of which the steam or other elastic fluid is admitted into the cylinder. The openings or ports through which the steam is admitted into the cylinder and discharged therefrom are opened and closed by valves which are located in valve-chests, and are moved at suitable intervals to open and close the ports, by means of mechanism which is commonly termed the "valve-gear" of the engine. In engines in which the steam is used expansively, the valve is made to close its port after a portion only of the stroke of the piston is completed to cut off the flow of steam from the boiler and permit that in the cylinder to expand. In order thus to cut off the steam, various valve apparatus have been devised, which differ from each other either in the kind of valve or of valve-gear employed, or in both of those particulars.

In order to the introduction of my improvement in any steam engine, it is requisite that a liberating valve-gear shall be provided—that is to say, a valve-gear which embodies two forces for operating the steam-valves, the one for their opening movement may be derived from the engine itself, the other, for the closing movement, may be derived from weights or springs, and while the arrangement may be such that the reciprocal operations of these two forces may give the proper movements for closing the valves at certain fixed periods of the stroke of the piston, there must be embodied a provision for effecting the closing of the valves, at variable periods of the stroke, by such a release of that portion of the valve-gear actuated by one force from that actuated by the other force, as will anticipate the time at which the valves would be closed if their closing was effected by the return movements of the opening mechanism.

Prior to my invention the liberating valve gear was applied to operate valves of the species known as "puppet" or "lifting valves," which valves are operated by being moved perpendicularly to the plane of their seats. As each valve of this species moves from its seat in opening and to its seat in closing, the commencement of the opening of the steam port is coincident with the commencement of the movement of the valve from a state of rest, and the completion of the closing of the steam-port is coincident with the return of the valve to a state of rest; but in order to use steam expansively with the best effect, it is necessary, and particularly in fast-moving engines, that the valve should move with rapidity in opening, so as to admit the steam at its full pressure into the cylinder, and that the valve should also move with great rapidity in closing, so as to avoid what is technically termed the "throttling" of the steam. Now, it is obvious that the immediate starting of a valve from a state of rest into rapid motion to effect the opening of the steam-port must be attended with concussion, or at least with a severe strain upon the mechanism which actuates it, and a severe concusion must also occur in suddenly bringing the valve to rest from a state of rapid motion in order to effect the closing of the steam-port. It has therefore been found necessary in practice to provide for a gradually accelerated movement of lifting-valves as they move from their seats to open, and a gradually retarded movement as they are returned to their seats to close. Economy in the use of steam has thus been sacrificed to the necessity of obviating the inherent practical defects which attend the use of lifting-valves. Their employment is also attended with the disadvantage that as they approach their seats the action of the steam tends to accelerate their movement, and thus increases their tendency to slam upon their seats.

The object of my invention is to obviate the foregoing, among other defects, in previous valve apparatus of steam-engines without sacrificing the important advantages resulting from the rapidity of movement which can be imparted to the valve by weights, springs, or the equivalents thereof, in cutting off the steam; and it consists in combining a slide-valve that moves beyond or overlaps its port with liberating valve-gear, whereby the valve, although started slowly from a state of rest, will be in rapid motion when the steam-port begins to open, and although returned to a state of rest with a retarded movement it will be in rapid motion under the action of a weight or spring, or its equivalent, at the time the port is being closed, the commencement of the opening of the port in this combination being subsequent to instead of coincident with the commencement of the movement of the valve, and the closing of the port being prior to the return of the liberated valve to a state of rest, instead of coincident therewith.

My present invention is represented in the accompanying drawings in connection with other inventions, for which patents bearing even date herewith have been granted to me. As, however, it may be used without the other improvements, and as these may be used independently of it, I shall in the present specification describe only so much of the mechanism of the steam-engine as I deem necessary to communicate a clear understanding of the invention herein claimed. The cylinder of this engine is constructed with four ports, to each of which a valve is applied. Two of these valves, *l* and *l*, are for opening ports at proper intervals to admit steam into the cylinder, and for closing them to stop its admission. The two remaining valves *m* and *m* are for opening other ports at proper intervals to permit the steam to escape from the cylinder after it has done its work, and to close them at proper intervals and keep them closed while steam is acting upon the piston.

In order to operate the steam-valves *l* and *l*, they are connected with valve-gear which is constructed in parts, one of which is permanently connected with each valve, while the other part is connected with an eccentric secured to the crank-shaft, so that it is constantly moved by the power of the engine while the latter is in operation. The part of this valve-gear connected permanently with each valve consists of a double valve-rod, *b′*, upon which a weight, *o′*, is arranged to act, through the intervention of a bent lever or bell-crank, *m′*, to cause the valve to close its port whenever the part of the valve-gear connected with it is separated from the remainder of the valve-gear. The other part of the valve-gear consists in this instance of two sliding blocks, *g g*, the bell-cranks *f f*, having teeth that engage with corresponding teeth in the blocks, the wrist-plate *x* and its appurtenances, and the eccentric *a′* with its appurtenances, the latter in its revolution causing the sliding blocks to traverse to and fro.

The part of the valve-gear connected permanently with each valve is fitted with a variable link or medium of connection, *h′*, which is hinged to the valve-rod *b′*, and has an acting face, *c*, which can be placed in contact with a corresponding face, *e*, formed upon the adjacent sliding block. When these two faces are in contact, the part of the valve-gear connected permanently with the valve is moved along with the remainder, so that the valve is drawn open, and the weight lifted by the power of the engine, the two acting faces *c e* remaining in contact until a separation is made by a lateral movement of the one to the other. Such a lateral movement is effected in the present example, when steam is to be cut off, by means of a cam, *k′*, which is turned by the power of the engine, through the intervention of a series of shafts and wheels, the last of which is secured to the crank-shaft. And as in this engine the shank of the link is not within the range of motion of the cam, a projection, *j′*, is secured to the link upon which the cam bears, when the separation of the one part of the valve-gear from the other, and the consequent liberation of the steam-valve, with its weight from the opening mechanism takes place, and the valve is then instantly closed by the power of the weight. Each steam-valve *l* is constructed in such manner that when it is at rest it overlaps its port, hence the valve may be moved a certain distance from its state of rest before it is time to commence the opening of its port, and, as such a preliminary movement of the valve does not affect the distribution of the steam, it may be effected with any degree of speed that may be deemed advisable. The valve may therefore be started slowly from its state of rest, and be moved with gradually-accelerated speed, so as to attain a rapid movement at the instant it begins to uncover its port; and the operation of the valve-gear is such that this kind of opening movement is imparted to the valve. On the other hand, the movement of the valve in returning, after opening its port, does not terminate at the instant at which the port is covered, as the valve continues to move until it has required its lap, hence a rapid movement of the valve in closing may be maintained until the port is entirely closed, after which the movement of the valve may be gradually retarded until it resumes its state of rest; or if the movement be not gradually retarded so as to bring the valve gradually to rest all concussion of the valve may be avoided by transferring the blow that would result from stopping the motion of the valve and of the parts connected therewith to some part of the valve-gear, which would not be injured by the shock. There is thus, as I have discovered, a peculiar adaptation of the properties of the liberating valve-gear to the properties of the overlapping slide-valve, for while the liberating system permits the valve to be closed with great speed independently of the opening mechanism by the force of gravity or springs, the space through which the valve may be moved beyond its port before it is brought to rest, affords ample time to bring it gradually to a state of rest, without in the least degree retarding the speed with which it closes its port. And even if the valve be not gradually brought to a state of rest, it need not suffer concussion, as it is not necessary that it should, like a lifting-valve, collide with a stationary part of the engine. Moreover, after the port is covered, the pressure of the steam from the boiler on the back of the valve is greater than that of the steam within the port on its face, and this pressure, by pressing the valve upon the seat on which it slides, produces friction which tends to retard its motion. As, however, friction alone is not sufficient in the present engine to bring the valve gradually to rest as soon as is desirable, and prevent the jar which would result from the sudden stoppage of the motion of the weight, each cross-block N has a cylindrical socket, *n'*, Fig. 7, to contain atmospheric air, open toward the steam-cylinder. And a piston, *p*, is secured to the engine-frame in such a position that it enters the socket, and fitting the same, the air is compressed therein as the valve closes, to form an elastic cushion to prevent the jar.

In order that each steam-valve may uncover its port at the proper moment to admit steam to the cylinder, the adjacent member of the part of the valve-gear appertaining to the eccentric, which, in this instance, is the sliding block *g'*, is moved back by the eccentric turned by the power of the engine, into such a position that the link *h'* can be moved laterly to place its acting face within the range of motion of the face upon the sliding block, when the latter is again moved to draw the valve along. This movement of the valve-gear takes place before the piston of the engine is ready to make its stroke from the adjacent end of the cylinder, and the lateral return movement of the link is effected by a spring, *i''*.

As it is desirable that the flow of steam to the cylinder should be cut off at different portions of the stroke of the piston according to the requirements of the work, the cams *k*, are helical—that is to say, the projecting part thereof extends around the shaft in a helical line, and the cam-shaft is constructed to slide endwise in its boxes, so that it may be moved up or down to cause the cams to act sooner or later upon the links of the valve-gear. As, however, the present invention may be used without varying the period of cut-off, and as neither the mode of varying the period nor the means of accomplishing this operation form part of the invention herein claimed, it is not deemed necessary to describe either of them more particularly, especially as they are fully described in other Letters Patent granted to me of even date herewith.

Having thus described my invention and one mode of embodying in a working-engine, I wish it to be understood that by the term "liberating valve-gear," as I have used it in this specification, I do not include those previous arrangements for working valves which consist of cams of various forms to open the valves, and then at certain periods of their rotation, suffer the valves to be closed by the force of weights or springs, but control and graduate the closing movement. Such arrangements of valve gear lack the capacity for varying the periods of closing the valves, combined with the promptness of closing at all speeds of the engine, which characterizes my improved valve-gear; and they differ from it also in other essential features, and though cams of various kinds may be used to open the valves in connection with my improved valve-gear, and weights or springs used to effect the closing of the valves, yet some arrangement is indispensable for releasing the valves at variable periods from the control of the cam which opens them to anticipate the return-movement which would otherwise occur by the regular operation of the cam in its rotation; but I do not limit myself to any particular construction of the valve so long as it moves across the port and overlaps it in closing, in contradistinction to shutting against a seat, as a lifting-valve does, or, in other words, so long as the valve is so constructed that its progressive motion can precede the opening of the port and continue after its closing. Neither do I confine myself to a liberating valve-gear of any peculiar construction; but

What I claim as my invention, and desire to secure by Letters Patent, is—

The combination of liberating valve-gear with valves which are moved parallel to their seats and continue their closing motion after their ports are closed, and commence their opening motion before their ports open, substantially as described.

In testimony whereof I have hereunto subscribed my name.

GEORGE H. CORLISS.

Witnesses:

HENRY BALDWIN, Jr.,
JOHN S. HOLLINGSHEAD.